United States Patent
Kang et al.

(10) Patent No.: US 11,287,996 B2
(45) Date of Patent: Mar. 29, 2022

(54) METHOD, DEVICE AND COMPUTER PROGRAM PRODUCT FOR STORING DATA

(71) Applicant: EMC IP Holding Company LLC, Hopkinton, MA (US)

(72) Inventors: Jianbin Kang, Beijing (CN); Geng Han, Beijing (CN); Jian Gao, Beijing (CN); Jibing Dong, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 16/877,871

(22) Filed: May 19, 2020

(65) Prior Publication Data
US 2021/0124517 A1 Apr. 29, 2021

(30) Foreign Application Priority Data
Oct. 29, 2019 (CN) .......................... 201911039335.3

(51) Int. Cl.
*G06F 3/06* (2006.01)

(52) U.S. Cl.
CPC .......... *G06F 3/0644* (2013.01); *G06F 3/0604* (2013.01); *G06F 3/0689* (2013.01)

(58) Field of Classification Search
CPC ..... G06F 3/0644; G06F 3/0604; G06F 3/0689
See application file for complete search history.

(56) References Cited

U.S. PATENT DOCUMENTS

| | | |
|---|---|---|
| 8,782,324 B1 | 7/2014 | Chen et al. |
| 10,146,456 B1 | 12/2018 | Gao et al. |
| 10,152,254 B1 | 12/2018 | Kang et al. |
| 10,235,082 B1 | 3/2019 | Gao et al. |
| 10,235,286 B1 | 3/2019 | Yu et al. |
| 10,365,847 B1 | 7/2019 | Miloslavsky et al. |
| 10,402,262 B1 | 9/2019 | Wu et al. |
| 10,481,802 B1 | 11/2019 | Gao et al. |
| 10,534,539 B1 | 1/2020 | Gao et al. |
| 10,534,558 B1 | 1/2020 | Miloslavsky et al. |
| 10,540,103 B1 | 1/2020 | Gao et al. |
| 10,592,138 B1 | 3/2020 | Han et al. |
| 10,592,165 B1 | 3/2020 | Han et al. |
| 10,747,617 B2 | 8/2020 | Gao et al. |
| 10,782,894 B1 | 9/2020 | Han et al. |
| 10,908,997 B1* | 2/2021 | Vankamamidi ..... G06F 12/0253 |
| 10,936,195 B2 | 3/2021 | Liu et al. |
| 2007/0294565 A1* | 12/2007 | Johnston ............. G06F 11/1076 714/6.12 |

(Continued)

*Primary Examiner* — Ryan Bertram
(74) *Attorney, Agent, or Firm* — BainwoodHuang

(57) ABSTRACT

Techniques involve dividing a disk in RAID into a plurality of slices, and the plurality of slices include a first slice and a second slice with a first size. The techniques further involve dividing the second slice into a plurality of sub-slices, and each sub-slice in the plurality of sub-slices has a second size smaller than the first size. The techniques further involve forming a first stripe set for storing user data using the first slice and forming a second stripe set for storing metadata using the sub-slices. Such techniques enable configuring a smaller slice size for the set stripe for the metadata, and thus the granularity of storage and migration for the metadata can be reduced, and the metadata can be distributed into more disks in the RAID.

20 Claims, 4 Drawing Sheets

(56) References Cited

U.S. PATENT DOCUMENTS

| | | | |
|---|---|---|---|
| 2013/0262920 A1* | 10/2013 | Jung | G06F 11/108 714/6.22 |
| 2016/0048342 A1* | 2/2016 | Jia | G06F 11/1076 711/114 |
| 2018/0107383 A1* | 4/2018 | Galbraith | G06F 11/1076 |
| 2020/0192758 A1* | 6/2020 | Pletka | G06F 3/0644 |

* cited by examiner

METHOD, DEVICE AND COMPUTER PROGRAM PRODUCT FOR STORING DATA

CROSS-REFERENCE TO RELATED APPLICATION

This application claims priority to Chinese Patent Application No. CN201911039335.3, on file at the China National Intellectual Property Administration (CNIPA), having a filing date of Oct. 29, 2019, and having "METHOD, DEVICE AND COMPUTER PROGRAM PRODUCT FOR STORING DATA" as a title, the contents and teachings of which are herein incorporated by reference in their entirety.

FIELD

Embodiments of the present disclosure generally relate to the field of data storage technology, and more specifically, to a method, device and computer program product for storing data.

BACKGROUND

Redundant Array of Independent Disks (RAID), as a data backup technology, can combine a plurality of independent physical disks in different ways to form a disk array (i.e., logical disk), so as to provide higher storage performance and reliability performance than a single disk. To recover the data when a disk in the RAID fails, the RAID is usually provided with one (such as RAID 1, RAID 3 or RAID 5 and so on) or more parity blocks (such as RAID 6). With respect to RAID 5, if a certain disk in the RAID fails, a new disk is added into the RAID. Then, the RAID can calculate the data in the failed disk through distributed parity information, and rebuild the data in the new disk for data recovery.

One RAID usually includes a plurality of disks, and the number of the disks is equal to or larger than the RAID width, wherein each disk is divided into a plurality of slices and each slice may has a fixed size (such as 4 GB). RAID uses stripes for storing data, for example, 5 slices on 5 disks are combined in the RAID 5 to form a RAID stripe set, which is also called an "Uber" that includes a plurality of stripes. In other words, one stripe set includes 4 data blocks and 1 parity block (i.e., "4D+1P"). When a certain disk in the RAID fails, the disk can be rebuilt through distributed parity information, such that the data can be recovered without any data loss.

SUMMARY

Embodiments of the present disclosure provide a method, device and computer program product for storing data.

In accordance with one aspect of the present disclosure, there is provided a method for storing data. The method includes dividing disks in a Redundant Array of Independent Disks (RAID) into a plurality of slices, wherein the plurality of slices includes a first slice and a second slice with a first size. The method further includes dividing the second slice into a plurality of sub-slices, wherein each sub-slice in the plurality of sub-slices has a second size smaller than the first size. The method further includes forming a first stripe set for storing user data using the first slice and forming a second stripe set for storing metadata using the sub-slices.

In accordance with another aspect of the present disclosure, there is provided an electronic device. The device includes a processing unit and a memory coupled to the processing unit and stored with instructions. The instructions, when executed at the processing unit, perform acts of dividing disks in a Redundant Array of Independent Disks (RAID) into a plurality of slices, wherein the plurality of slices includes a first slice and a second slice with a first size. The acts further include dividing the second slice into a plurality of sub-slices, wherein each sub-slice in the plurality of sub-slices has a second size smaller than the first size. The acts further include forming a first stripe set for storing user data using the first slice and forming a second stripe set for storing metadata using the sub-slices.

In accordance with a further aspect of the present disclosure, there is provided a computer program product tangibly stored on a non-transitory computer readable medium and includes computer-executable instructions. The computer-executable instructions, when executed, cause a computer to perform the method or the procedure in accordance with embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of respective embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1:
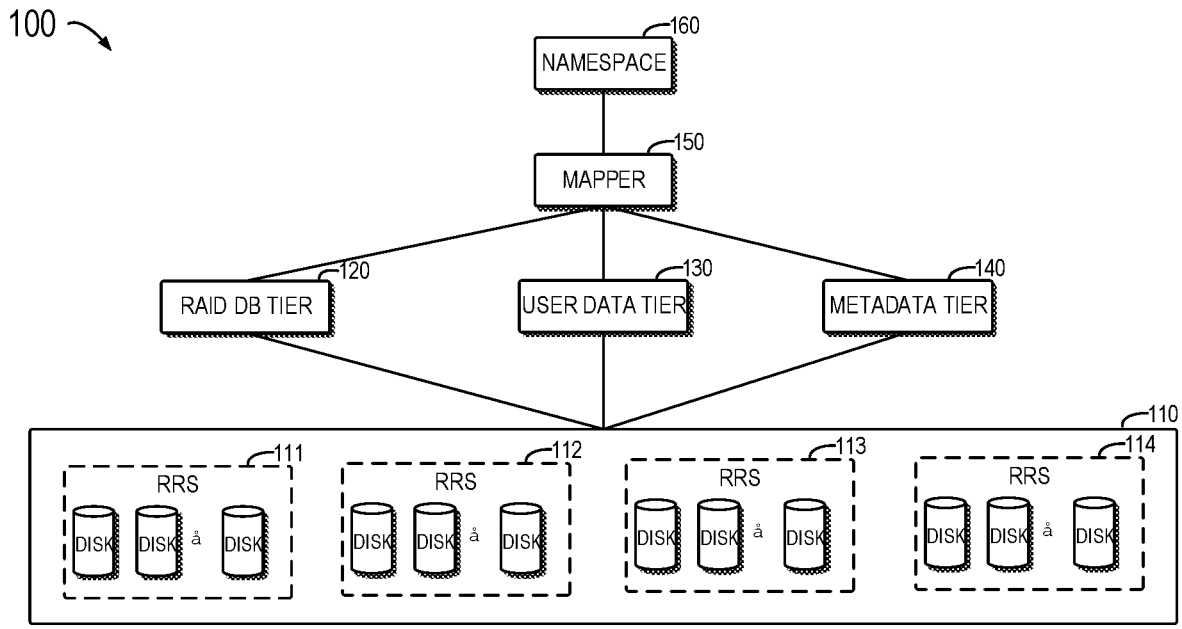
FIG. 1 illustrates a schematic diagram of an example environment of a storage system in accordance with embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless indicated otherwise.

Traditionally, each disk in the RAID is divided into a plurality of slices and each slice has a fixed size (such as 4 GB). However, the inventors of the present application find that a metadata tier usually is much smaller than a user data tier in the mapper, and the metadata is only a small percentage of the entire data, such as about 5% or other numbers, whereas I/O access to the metadata tier is higher than that to the user data tier.

In traditional methods, both the metadata tier and the user data tier use the same slice size in the mapper. Therefore, traditional methods may affect system performance in the following two aspects. First, if the user data are insufficient, the metadata tier in the mapper is so small that it cannot be distributed over all disks. For example, for a RAID Resilience Set (RRS) which includes 25 disks, if the user data is too small, the mapper metadata tier may consume only one stripe set (i.e., Uber), only two disk slices. As a result, only two disks are provided for serving all metadata I/O. Second, the metadata may be only distributed over one or more stripe sets for small hot data. When the hot data are accessed, only a few disks provide metadata I/O, which affects the access speed.

Embodiments of the present disclosure provide a solution of setting different dynamic sizes of slices for different mapper tiers. As compared with stripe sets of the user data, embodiments of the present disclosure set a smaller slice size for the set stripe of the metadata, thereby reducing granularity of storage and migration of the metadata and distributing the metadata into more disks of the RAID. Therefore, the data access speed can be enhanced and the performance of the metadata tier can be boosted.

In addition, some embodiments of the present disclosure can balance well among data migration granularity, memory consumption for metadata, and the calculation of the stripe set layout. Accordingly, embodiments of the present disclosure only decrease the slice size of the metadata tier while keeping the slice size of the user data unchanged. In this case, both the storage consumption of the metadata and the total number of the stripe sets will not increase too much.

Basic principles and several example implementations of the present disclosure are described below with reference to FIGS. 1 to 7. It should be understood that these example embodiments are provided only for enabling those skilled in the art to better understand and further implement embodiments of the present disclosure, rather than restricting the present disclosure in any manner.

FIG. 1 illustrates a schematic diagram of an example environment 100 of a storage system in accordance with embodiments of the present disclosure. As shown in the example environment 100 of FIG. 1, a storage pool 110 includes a plurality of RSS 111, 112, 113 and 114, and each RRS forms a fault domain. This means that if one disk or one disk drive in a certain RRS fails, the reliability of other RRS will not be affected. The storage pool 110 manages all disk drives in the storage system. In embodiments of the present disclosure, each RRS may include a plurality of disk drives, such as between 5 and 25. In some embodiments of the present disclosure, each RRS includes 25 disk drives. However, other numbers may be also possible.

Each disk may be divided into disk slices with fixed size, such as slices with 4 GB. Embodiments of the present disclosure introduce a concept "sub-slice" and suggest setting different slice sizes for different types of data. For example, the slice size may be fixed at 4 GB for the user data. However, for the metadata with small data size and high access frequency, the slice may be further divided into sub-slices (the size of each sub-slice may be 16 MB only), which form the stripe set for storing the metadata.

Different slices on various disks may compose one stripe set (Uber), and a plurality of stripe sets may form a mapper tier. For example, stripe sets may be allocated from the storage pool 110. For RAID 5, it is required to allocate 5 free slices from 5 disks to form one stripe set and further constitute one RAID stripe set. In addition, it should be ensured that all slices included in one stripe set come from the same RRS. Each stripe set contains a plurality of RAID stripes. In some embodiments, each stripe in the stripe set may be of 2 MB and the stripe is also known as Physical Large Block (PLB).

The storage pool 110 exposes some tiers (such as user data tier, metadata tier and the like) for use by other components. Each tier may include a plurality of stripe sets and is applied with respective RAID strategy based on its data type. All stripe sets in one tier are applied with the same RAID strategy, for example, same RAID width and RAID type. The tier may be expanded on demand and new stripe sets may be dynamically allocated to corresponding tiers.

As shown in the example environment 100, RAID database tier 120, user data tier 130 and metadata tier 140 may be built. These tiers are respectively mapped, by a mapper 150, to a namespace 160 for use by external users, wherein the storage pool 110, the RAID database tier 120, the user data tier 130, the metadata tier 140 and the mapper 150 may constitute an entire RAID system. As a core component of the RAID, the mapper 150 treats each tier as a flat linear physical address space and further exposes an individual flat linear logical address space to the name space 160. For example, the logical address space may be huge. In some embodiments, the mapper 150 maintains mapping between logical address and physical address in granularity of pages with a B+ tree. The namespace 160 consumes and manages the linear logical space exposed by the mapper 150, and will create a volume and further expose the volume to an external host.

Moreover, although not shown, the storage system also may include modules and components like cache, log recorder, log data tier, log metadata tier and the like, wherein the cache provides buffer function in the memory. Two instances of this function are provided in the system, and one instance is for user data while the other instance is for metadata. The cache provides transactional operation functionality for the mapper 150 to accelerate the data access speed.

Figure 2:
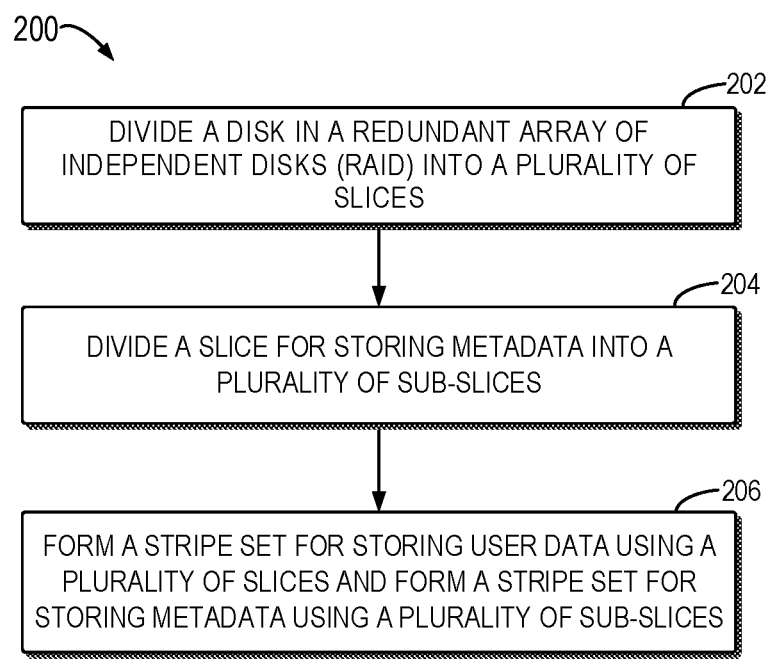
FIG. 2 illustrates a flowchart of a method for storing different types of data using different slice sizes in accordance with embodiments of the present disclosure.

FIG. 2 illustrates a flowchart of a method 200 for storing different types of data with different slice sizes in accordance with embodiments of the present disclosure. For the purpose of better description, the method 200 is described here with reference to both FIG. 1 and FIG. 3.

At 202, a disk(s) in the RAID is divided into a plurality of slices, and the plurality of slices include a first slice and a second slice with a first size. For example, each disk drive in the storage pool 110 of FIG. 1 is divided into a plurality of slices of fixed size, and the size of each slice, for example, may be 4 GB.

Figure 3:
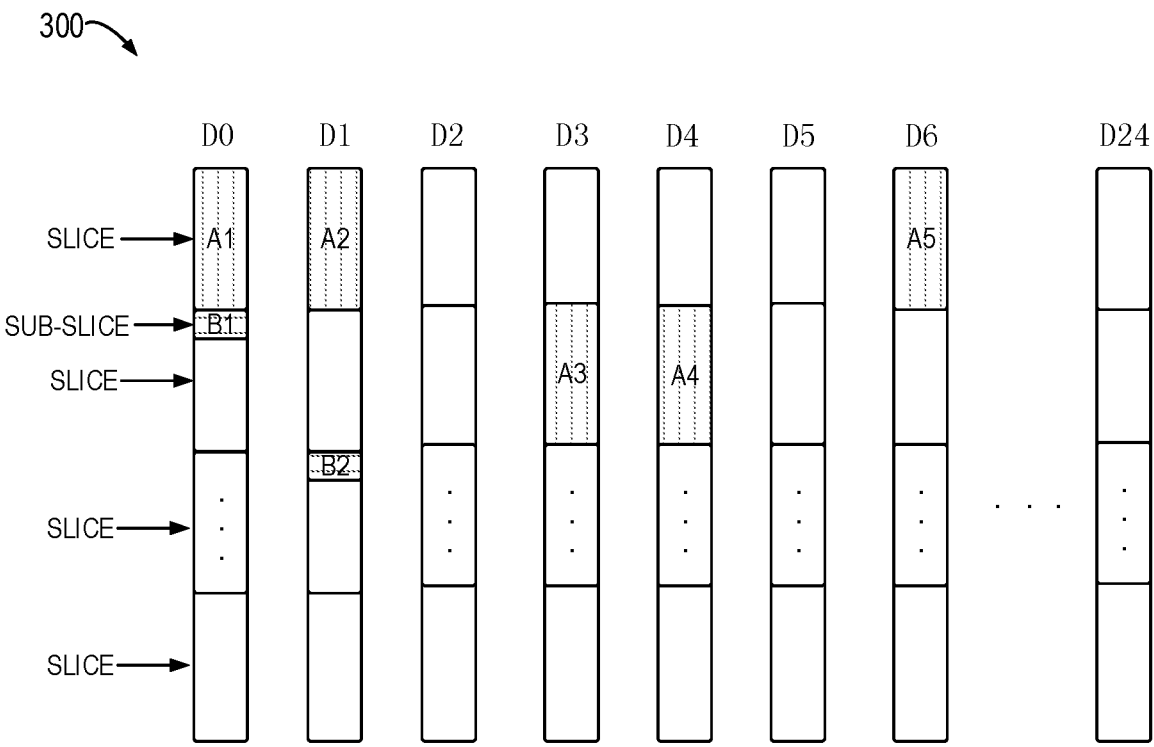
FIG. 3 illustrates a schematic diagram of slices and sub-slices in the RAID disk in accordance with embodiments of the present disclosure.

FIG. 3 illustrates a schematic diagram 300 of slices and sub-slices in the RAID disk in accordance with embodiments of the present disclosure. Disks D0, D1, D2, D3, D4, D5, D6 ... D24 may act as 25 disk drives in one RRS in the storage pool, and each disk (for example with a size of 10 TB) is firstly divided into a plurality of slices according to a predetermined size (such as 4 GB). As shown in FIG. 3, the disk D0 is divided into a plurality of slices, such as first slice (i.e., slice A1) and second slice and so on.

Refer back to FIG. 2, at 204, the second slice is divided into a plurality of sub-slices, and each sub-slice of a plurality of sub-slices has a second size smaller than the first size. Embodiments of the present disclosure propose the concept of sub-slice of a slice. For example, with reference to FIG. 3, the second slice in the disk D0 is used for storing metadata and therefore is further divided into sub-slices with the second size (such as sub-slice B1), and the second size, for example, may be 16 MB. Accordingly, in the example of FIG. 3, the second slice of the disk D0 may be divided into 256 sub-slices, and the sub-slice B1 is one of the sub-slices. The number of sub-slices of each slice may be configured, for example, to a maximum number of 256. However, each mapper tier may select the number of sub-slices in each slice as $2^n$, where n is between 0 and 8. In some embodiments of the present disclosure, n is set to 0 for the user data tier and to 8 for the metadata tier. Therefore, each slice of the user data tier is of 4 GB, while each sub-slice of the metadata tier is of 16 MB.

At 206, a first stripe set for storing the user data is formed using first slices, and a second stripe set for storing the metadata is formed using sub-slices. With reference to FIG. 3, the user data stripe set is comprised of 5 slices (slice A1 from disk D0, slice A2 from disk D1, slice A3 from disk D3, slice A4 from disk D4 and slice A5 from disk D6) with the first size (such as 4 GB), and the metadata stripe set consists of 2 sub-slices (sub-slice B1 from disk D0 and sub-slice B2 from disk D1) with the second size (such as 16 MB). The user data uses the RAID 5 technology while the metadata uses the RAID 1 technology. However, user data and/or metadata also may be implemented using other levels of RAID.

Therefore, as compared with the user data stripe set, the method 200 in accordance with embodiments of the present disclosure set smaller slice size for the metadata stripe set, so as to reduce the granularity of storage and migration of metadata and distribute the metadata into more disks of the RAID, thereby increasing the data access speed.

In the example of FIG. 3, slices A1, A2, A3, A4 and A5 form a user data stripe set, and a plurality of user data stripe sets may constitute the user data tier for the mapper, such as the user data tier 130 shown in FIG. 1. Sub-slices B1 and B2 form a metadata stripe set, and a plurality of metadata stripe sets may constitute the metadata tier for the mapper, such as the metadata tier 140 shown in FIG. 1. In this way, the user data and the metadata are provided in different granularities and sizes, for use by the external host, and the metadata are stored more dispersed in a plurality of disks. Therefore, the system performance is boosted when the metadata are accessed.

Figure 4:
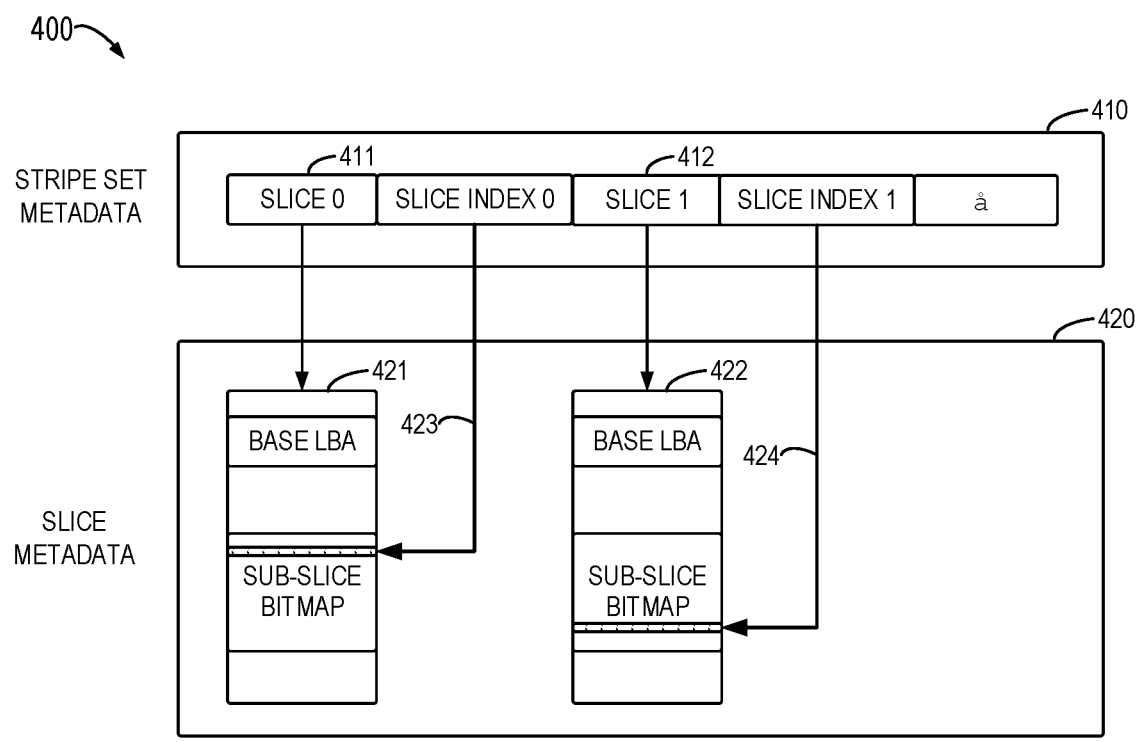
FIG. 4 illustrates a schematic diagram of stripe set metadata and slice metadata in accordance with the present disclosure.

FIG. 4 illustrates a schematic diagram 400 of stripe set metadata and slice metadata in accordance with the present disclosure. A sub-slice bitmap may be added in the slice metadata 420, and each bit of the sub-slice bitmap indicates whether each sub-slice has been allocated. The stripe set metadata 410 records sub-slice indexes of the sub-slices, such that a logical block address of each sub-slice can be determined based on the logical block address of the slice and the corresponding sub-slice index. As shown in FIG. 4, the stripe set metadata 410 records metadata 411 of the slice 0 and metadata 412 of the slice 1. Their sub-slice indices respectively point to corresponding metadata 421 and 422 in the slice metadata 420, as indicated by 423 and 424. The slice metadata 420 includes sub-slice bitmap of each slice, wherein each bit indicates whether the sub-slice has been allocated. When a certain sub-slice is allocated, the stripe set metadata 410 is recorded therein with a sub-slice index of the sub-slice to point to a corresponding bit in the sub-slice bitmap.

The metadata of the sub-slices should be stored using a separate data structure, and it may be directly maintained by respective slices. In the embodiments of the present disclosure, 32 bytes may be added into the metadata of the respective slices as sub-slice bitmap, and each bit in the 32 bytes represents respective sub-slices. Therefore, the maximum number of sub-slices is 32×8=256. If a certain bit is 1, it means that the corresponding sub-slice has been allocated; on the contrary, if a certain bit is 0, the corresponding sub-slice has not been allocated yet, and thus it is free.

The stripe set includes pointers pointing to slices at each position. Embodiments of the present disclosure may add 1 byte to each position as sub-slice index. For example, if the byte is 0, the metadata stripe set uses the sub-slice 0; if the byte is 0xff, the metadata stripe set uses the sub-slice 0xff.

The number of sub-slices and the size of each sub-slice are stored in the metadata of each tier. All stripe sets in the same tier share the same sub-slice size. If the number of sub-slices is smaller than 256, only a portion of the 32 bytes is utilized. For example, if each slice merely has 128 sub-slices, only 16 bytes are used as the sub-slice bitmap, and the other 16 bytes should be cleared for other purposes.

As shown in FIG. 4, base LBA address of a sub-slice=base LBA address of a slice+sub-slice size×sub-slice index, and the base LBA address of the slice is a start LBA of each slice, which may be obtained from the metadata of the slice.

Figure 5:
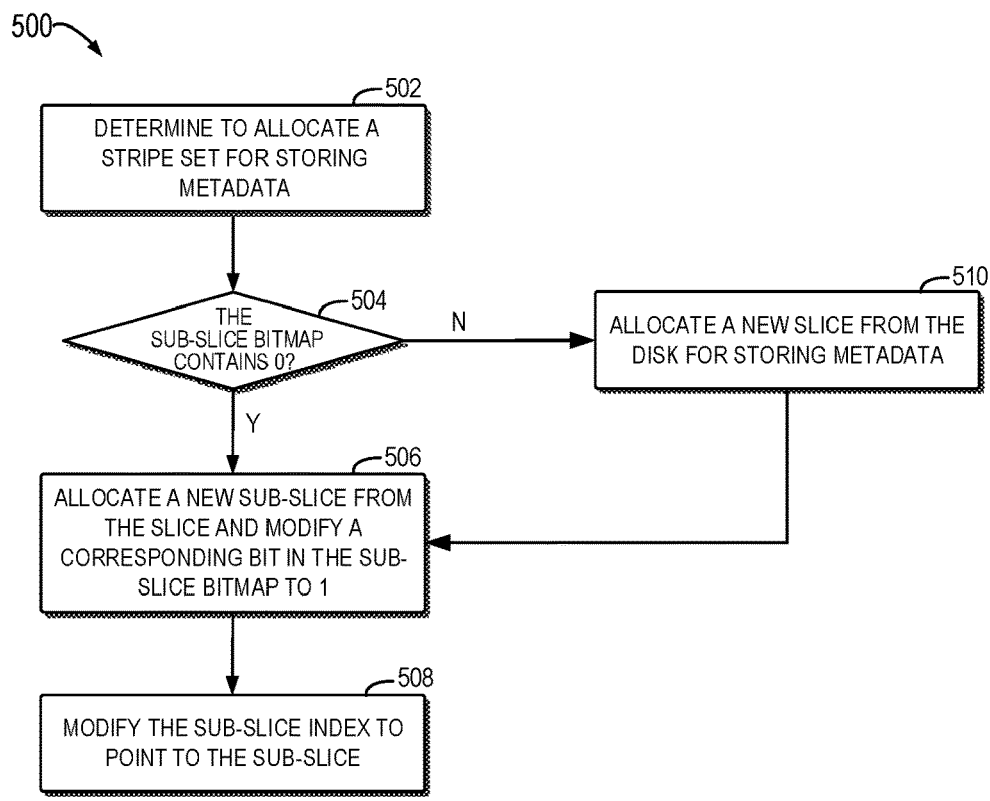
FIG. 5 illustrates a flowchart of a method for allocating a metadata stripe set in accordance with embodiments of the present disclosure.

FIG. 5 illustrates a flowchart of a method 500 for allocating a metadata stripe set in accordance with embodiments of the present disclosure. At 502, it is determined to allocate a metadata stripe set. For example, disks to be allocated may be selected through some algorithms to uniformly allocate the entire RAID as much as possible. At 504, it is determined whether the sub-slice bitmap of the allocated slice contains 0. For example, a slice which has been allocated with sub-slice(s) is searched for every disk. If the sub-slice bitmap of this slice indicate 0 at certain bit(s), the slice is selected at 506. A new sub-slice of 16 MB is allocated from the slice and a corresponding bit in the sub-slice bitmap of the slice is modified to 1. Then, the sub-slice index is modified to point to the sub-slice at 508.

If it is determined that the sub-slice bitmap does not contain any bit of 0 at 504, it means that no slice contains free sub-slices. Then, a new slice of 4 GB is allocated from the disk for storing the metadata at 510, and the above steps 506 and 508 are performed subsequently. In accordance with embodiments of the present disclosure, the allocation method allocates new sub-slices from the used slices if a certain used slice contains available sub-slice(s), which can reduce fragmentation in the disks.

Figure 6:
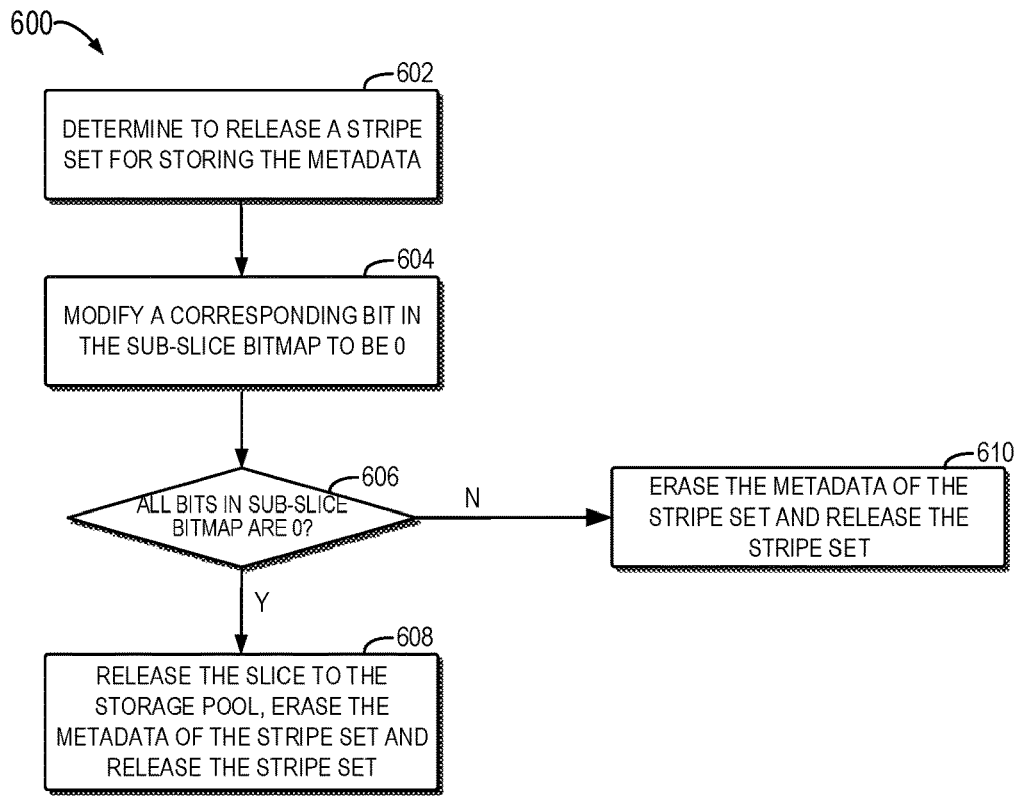
FIG. 6 illustrates a flowchart of a method for releasing a metadata stripe set in accordance with embodiments of the present disclosure.

FIG. 6 illustrates a flowchart of a method 600 for releasing a metadata stripe set in accordance with embodiments of the present disclosure. At 602, it is determined to release the metadata stripe set. At 604, for each slice related to the metadata stripe set, corresponding bit in the sub-slice bitmap of the slice is modified to be 0. At 606, it is determined whether all bits in the sub-slice bitmap of each slice are 0. If no, the metadata of the stripe set is erased and the stripe set is also released at 610. If yes, the slice is released to the storage pool, and then the metadata of the stripe set is erased and the stripe set is released. Therefore, the unused slice can be returned to the storage pool.

Embodiments of the present disclosure set small slice size for the metadata stripe set to reduce the granularity for metadata storage and migration and distribution of the metadata into more disks of the RAID, thereby increasing the data access speed. In addition, embodiments of the present disclosure enhance compatibility with only a small amount of modifications. Embodiments of the present disclosure only increase a small amount of metadata occupation for metadata of each stripe set. Furthermore, as the proportion of the metadata is small, the number of metadata stripe sets added by embodiments of the present disclosure is also small. On the contrary, if sizes of all slices are reduced in the storage system, the number of stripe sets will increase too much, which further raises metadata consumption.

Figure 7:
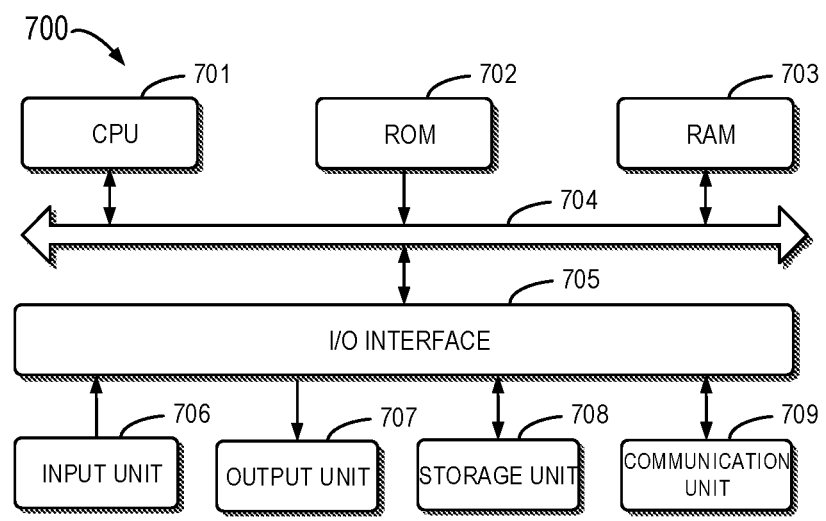
FIG. 7 illustrates a schematic block diagram of a device for implementing embodiments of the present disclosure.

FIG. 7 illustrates a schematic block diagram of a device 700 for implementing embodiments of the present disclosure. The device 700 can be a device or apparatus as described in embodiments of the present disclosure. As shown, the device 700 includes a central processing unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. The CPU 701, ROM 702 and RAM 703 are connected to each other via a bus 704. The input/output (I/O) interface 705 is also connected to the bus 704.

A plurality of components in the device 700 are connected to the I/O interface 705, including: an input unit 706, such as keyboard, mouse and the like; an output unit 707, such as various kinds of display and loudspeakers; a storage unit 708, such as disk and optical disk; and a communication unit 709, such as network card, modem, wireless transceiver and the like. The communication unit 709 allows the device 700 to exchange information/data with other devices via the computer network, such as Internet, and/or various telecommunication networks.

The above described method or procedure can be executed by the processing unit 701. For example, in some embodiments, the method can be implemented as a computer software program tangibly included in the machine-readable medium, such as storage unit 708. In some embodiments, the computer program can be partially or fully loaded and/or mounted to the device 700 via ROM 702 and/or communication unit 709. When the computer program is loaded to RAM 703 and executed by the CPU 701, one or more steps or acts of the above described method or procedure can be implemented.

In some embodiments the above described method and procedure can be implemented as computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro-codes, firmware instructions, state setting data, or source codes or target codes written in any combinations of one or more programming languages, wherein the programming languages consist of object-oriented programming languages and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (such as connected via Internet using the Internet service provider). In some embodiments, state information of the computer-readable program instructions is used to customize an electronic circuit, such as programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/acts stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or acts, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each embodiment and technical improvements made in the market by each embodiment, or enable other ordinary skilled in the art to understand respective embodiments of the present disclosure.

We claim:

1. A method for storing data, comprising:
   dividing a disk in a Redundant Array of Independent Disks (RAID) into a plurality of slices, the plurality of slices comprising a first slice and a second slice with a first size;
   dividing the second slice into a plurality of sub-slices, a sub-slice in the plurality of sub-slices having a second size smaller than the first size; and
   forming a first stripe set for storing user data using the first slice and forming a second stripe set for storing metadata using the sub-slices;
   wherein dividing the second slice into a plurality of sub-slices comprises:
   adding a predetermined size of storage space into slice metadata; and
   setting a sub-slice bitmap of the second slice using the storage space, each bit in the sub-slice bitmap indicating whether each sub-slice has been allocated.

2. The method of claim 1, wherein forming a first stripe set for storing user data using the first slice and forming a second stripe set for storing metadata using the sub-slices comprises:
   forming the first stripe set based on RAID 5 using five slices in five disks of the RAID; and
   forming the second stripe set based on RAID 1 using two sub-slices in two disks of the RAID.

3. The method of claim 1, wherein the first stripe set is a first type of stripe set and the second stripe set is a second type of stripe set, and the method further comprises:
   combining a plurality of first type of stripe sets into a user data tier for a mapper; and
   combining a plurality of second type of stripe sets into a metadata tier for the mapper.

4. The method of claim 1, wherein forming a second stripe set for storing metadata using the sub-slices comprises:
   recording sub-slice indexes of the sub-slices in stripe set metadata, so as to determine logical block addresses of the sub-slices based on a logical block address of the second slice and the sub-slice indexes.

5. The method of claim 4, further comprising:
   allocating, from a given disk, a given slice for storing metadata;
   allocating one sub-slice from the given slice; and
   modifying, a bit in a sub-slice bitmap of the given slice corresponding to the one sub-slice, from a first value to a second value.

6. The method of claim 5, further comprising:
   determining whether all bits in the sub-slice bitmap of the given slice contain the first value;
   in accordance with a determination that no bit in the sub-slice bitmap of the given slice contains the first value, allocating, from the given disk, a third slice for storing metadata; and
   in accordance with a determination that one or more bits in the sub-slice bitmap of the given slice contain the first value, allocating a further sub-slice from the given slice.

7. The method of claim 5, further comprising:
   in accordance with determining to release the one sub-slice, modifying, the bit in a sub-slice bitmap of the given slice corresponding to the one sub-slice, from the second value to the first value.

8. The method of claim 7, further comprising:
in accordance with a determination that all bits in a sub-slice bitmap of the given slice are set to the first value, releasing the given slice to the given disk.

9. An electronic device, comprising:
a processing unit; and
a memory coupled to the processing unit and stored with instructions, the instructions, when executed by the processing unit, performing acts of:
dividing a disk in a Redundant Array of Independent Disks (RAID) into a plurality of slices, the plurality of slices comprising a first slice and a second slice with a first size;
dividing the second slice into a plurality of sub-slices, a sub-slice in the plurality of sub-slices having a second size smaller than the first size; and
forming a first stripe set for storing user data using the first slice and forming a second stripe set for storing metadata using the sub-slices;
wherein dividing the second slice into a plurality of sub-slices comprises:
adding a predetermined size of storage space into slice metadata; and
setting a sub-slice bitmap of the second slice using the storage space, each bit in the sub-slice bitmap indicating whether each sub-slice has been allocated.

10. The device of claim 9, wherein forming a first stripe set for storing user data using the first slice and forming a second stripe set for storing metadata using the sub-slices comprises:
forming the first stripe set based on RAID 5 using five slices in five disks of the RAID; and
forming the second stripe set based on RAID 1 using two sub-slices in two disks of the RAID.

11. The device of claim 9, wherein the first stripe set is a first type of stripe set and the second stripe set is a second type of stripe set, wherein the acts further comprise:
combining a plurality of first type of stripe sets into a user data tier for a mapper; and
combining a plurality of second type of stripe sets into a metadata tier for the mapper.

12. The device of claim 9, wherein forming a second stripe set for storing metadata using the sub-slices comprises:
recording sub-slice indexes of the sub-slices in stripe set metadata, so as to determine logical block addresses of the sub-slices based on a logical block address of the second slice and the sub-slice indexes.

13. The device of claim 12, the acts further comprising:
allocating, from a given disk, a given slice for storing metadata;
allocating one sub-slice from the given slice; and
modifying, a bit in a sub-slice bitmap of the given slice corresponding to the one sub-slice, from a first value to a second value.

14. The device of claim 13, the acts further comprising:
determining whether all bits in the sub-slice bitmap of the given slice contain the first value;
in accordance with a determination that no bit in the sub-slice bitmap of the given slice contains the first value, allocating, from the given disk, a third slice for storing metadata; and
in accordance with a determination that one or more bits in the sub-slice bitmap of the given slice contain the first value, allocating a further sub-slice from the given slice.

15. The device of claim 13, the acts further comprising:
in accordance with determining to release the one sub-slice, modifying, the bit in a sub-slice bitmap of the given slice corresponding to the one sub-slice, from the second value to the first value.

16. The device of claim 15, the acts further comprising:
in accordance with a determination that all bits in a sub-slice bitmap of the given slice are set to the first value, releasing the given slice to the given disk.

17. A computer program product having a non-transitory computer readable medium which stores a set of instructions to store data; the set of instructions, when carried out by computerized circuitry, causing the computerized circuitry to perform a method of:
dividing a disk in a Redundant Array of Independent Disks (RAID) into a plurality of slices, the plurality of slices comprising a first slice and a second slice with a first size;
dividing the second slice into a plurality of sub-slices, a sub-slice in the plurality of sub-slices having a second size smaller than the first size; and
forming a first stripe set for storing user data using the first slice and forming a second stripe set for storing metadata using the sub-slices;
wherein dividing the second slice into a plurality of sub-slices comprises:
adding a predetermined size of storage space into slice metadata; and
setting a sub-slice bitmap of the second slice using the storage space, each bit in the sub-slice bitmap indicating whether each sub-slice has been allocated.

18. The method of claim 1, wherein dividing the disk in the RAID into the plurality of slices includes:
forming, as the first slice, a first storage space on the disk; and
forming, as the second slice, a second storage space on the disk, the first storage space and the second storage space being adjacent to each other on the disk.

19. The computer program product of claim 17, wherein forming a first stripe set for storing user data using the first slice and forming a second stripe set for storing metadata using the sub-slices comprises:
forming the first stripe set based on RAID 5 using five slices in five disks of the RAID; and
forming the second stripe set based on RAID 1 using two sub-slices in two disks of the RAID.

20. The computer program product of claim 17, wherein the first stripe set is a first type of stripe set and the second stripe set is a second type of stripe set, and the method further comprises:
combining a plurality of first type of stripe sets into a user data tier for a mapper; and
combining a plurality of second type of stripe sets into a metadata tier for the mapper.

* * * * *